(12) United States Patent
Shaffer et al.

(10) Patent No.: US 11,771,004 B2
(45) Date of Patent: Oct. 3, 2023

(54) MULCH DOOR WITH SENSOR

(71) Applicant: The Toro Company, Bloomington, MN (US)

(72) Inventors: Chadwick Aaron Shaffer, Oakdale, MN (US); Todd Allen Porter, Rosemount, MN (US); John Orville Hurst, Lakeville, MN (US); Ryan Mark Petersen, Shoreview, MN (US)

(73) Assignee: The Toro Company, Bloomington, MN (US)

( * ) Notice: Subject to any disclaimer, the term of this patent is extended or adjusted under 35 U.S.C. 154(b) by 606 days.

(21) Appl. No.: 16/832,554

(22) Filed: Mar. 27, 2020

(65) Prior Publication Data

US 2020/0323130 A1 Oct. 15, 2020

Related U.S. Application Data

(60) Provisional application No. 62/831,502, filed on Apr. 9, 2019.

(51) Int. Cl.
*A01D 43/063* (2006.01)
*A01D 34/71* (2006.01)
(Continued)

(52) U.S. Cl.
CPC ....... *A01D 43/0631* (2013.01); *A01D 34/005* (2013.01); *A01D 34/71* (2013.01); *A01D 34/81* (2013.01); *A01D 2101/00* (2013.01)

(58) Field of Classification Search
CPC .. A01D 34/008; A01D 34/006; A01D 34/005; A01D 34/71; A01D 34/81;
(Continued)

(56) References Cited

U.S. PATENT DOCUMENTS 3,319,282 A   5/1967   Macfarland
3,389,541 A   6/1968   Freedlander et al.
(Continued)

FOREIGN PATENT DOCUMENTS

CN   104041239   9/2014
EP   3210452   8/2017
(Continued)

OTHER PUBLICATIONS

"Blades Product Brochure," The Toro Company, 2012 (2 pages).
(Continued)

*Primary Examiner* — Thomas B Will
*Assistant Examiner* — Madeline I Runco
(74) *Attorney, Agent, or Firm* — Pauly, DeVries Smith & Deffner LLC

(57) ABSTRACT

A mower includes a cutting deck supporting a cutting blade having a fixed blade sail and a door having a first position in which the door covers an opening through which grass clippings can pass, and a second position in which the door does not cover the opening. The mower also has a switch configured to send a mode signal indicating that the door is in the first position or the second position. The mower also has a controller configured to receive the mode signal and adjust the cutting blade to rotate at a first speed when the mode signal indicates that the door is in the first position, and a second speed when the mode signal indicates that the door is in the second position. The mower also includes an electric battery to power rotation of the cutting blade.

20 Claims, 13 Drawing Sheets

(51) Int. Cl.
*A01D 34/00* (2006.01)
*A01D 34/81* (2006.01)
*A01D 101/00* (2006.01)

(58) Field of Classification Search
CPC .. A01D 34/00–34/905; A01D 43/06–43/0638; A01D 34/56; A01D 34/58; A01D 34/76; A01D 34/78
See application file for complete search history.

(56) References Cited

U.S. PATENT DOCUMENTS

| | | | |
|---|---|---|---|
| 3,724,182 A | | 4/1973 | Long et al. |
| 3,762,138 A | | 10/1973 | Michael |
| 4,015,408 A | | 4/1977 | Cornellier |
| 4,043,102 A | * | 8/1977 | Uhlinger .......... A01D 43/0631 56/202 |
| 4,951,449 A | | 8/1990 | Thorud |
| 5,040,364 A | | 8/1991 | Deegan |
| 5,179,823 A | * | 1/1993 | Pace ................. A01D 43/16 56/16.9 |
| 5,259,176 A | | 11/1993 | Kahamura et al. |
| 5,377,774 A | | 1/1995 | Lohr |
| 5,606,851 A | * | 3/1997 | Bruener ............. A01D 34/74 56/10.8 |
| 5,950,408 A | | 9/1999 | Schaedler |
| 6,751,937 B2 | | 6/2004 | Kobayashi et al. |
| 6,818,860 B1 | | 11/2004 | Stava et al. |
| 6,862,875 B2 | | 3/2005 | Iida et al. |
| 7,367,174 B2 | | 5/2008 | Grimwade |
| 7,884,560 B2 | | 2/2011 | Lucas et al. |
| 8,966,870 B2 | | 3/2015 | Mackinnon et al. |
| 9,265,196 B2 | | 2/2016 | Albinger et al. |
| 9,307,695 B2 | | 4/2016 | Nishihara et al. |
| 10,085,380 B2 | * | 10/2018 | Kuriyagawa ...... A01D 43/0631 |
| 11,388,857 B2 | * | 7/2022 | Kurihara ................ A01D 34/63 |
| 2004/0187463 A1 | | 9/2004 | Eddy |
| 2005/0066643 A1 | | 3/2005 | Fukushima et al. |
| 2009/0008368 A1 | | 1/2009 | Beeson et al. |
| 2011/0043143 A1 | * | 2/2011 | Alter ...................... H02P 4/00 318/3 |
| 2012/0000173 A1 | | 1/2012 | Papke et al. |
| 2012/0198807 A1 | | 8/2012 | Upham |
| 2012/0228041 A1 | | 9/2012 | Borinato |
| 2013/0152536 A1 | * | 6/2013 | Haraqia ................ A01D 75/20 56/10.2 R |
| 2014/0252996 A1 | | 9/2014 | Lucas et al. |
| 2016/0183451 A1 | | 6/2016 | Conrad et al. |
| 2017/0245426 A1 | | 8/2017 | Kuriyagawa et al. |
| 2017/0245427 A1 | | 8/2017 | Kuriyagawa et al. |
| 2017/0245428 A1 | | 8/2017 | Kuriyagawa et al. |
| 2017/0245429 A1 | | 8/2017 | Kuriyagawa et al. |
| 2017/0245431 A1 | | 8/2017 | Kuriyagawa et al. |
| 2017/0245432 A1 | | 8/2017 | Yoshimura et al. |
| 2017/0245436 A1 | | 8/2017 | Kuriyagawa et al. |
| 2017/0265395 A1 | | 9/2017 | Kuriyagawa et al. |
| 2019/0307071 A1 | * | 10/2019 | Kuriyagawa .......... A01D 34/64 |
| 2020/0245555 A1 | * | 8/2020 | Colber ................. A01D 34/824 |

FOREIGN PATENT DOCUMENTS

| | | | | |
|---|---|---|---|---|
| EP | 3278654 A1 | * | 2/2018 | ......... A01D 43/0631 |
| FR | 2489651 | | 3/1982 | |
| FR | 2665609 A1 | * | 2/1992 | |
| GB | 438622 | | 11/1935 | |
| GB | 506169 | | 5/1939 | |
| JP | 5626773 B2 | * | 11/2014 | |
| WO | WO-2021079176 A1 | * | 4/2021 | ........... A01D 34/662 |

OTHER PUBLICATIONS

"Honda HRX Lawnmower Press Kit—Versamow System," American Honda Motor Co., Inc, Oct. 17, 2003 (8 pages).

Pinnock, Clive "Mower Blades—The Sum of all Parts," Pitchcare.com, retrieved Dec. 19, 2018 at https://www.pitchcare.com/news-media/mower-blades-the-sum-of-all-parts.html (5 pages).

* cited by examiner

MULCH DOOR WITH SENSOR

This application claims the benefit of U.S. Provisional Application No. 62/831,502, filed Apr. 9, 2019, the contents of which are herein incorporated by reference.

BACKGROUND

Walk-behind rotary mowers for cutting grass use a rotating blade to clip grass as a user pushes the mower along the grass. Rotary mowers have a blade that is powered by a motor and a cutting deck that houses the blade. The geometry of the cutting deck and the cutting blade, as well as the speed of the blade, affect how grass is cut and how it is conveyed within the cutting deck.

Grass clippings can be disposed of in a number of ways that include discharging, bagging and mulching. When discharging, grass clippings are ejected from the cutting deck onto the surrounding area without being collected. When bagging grass clippings, the clippings are ejected from the cutting deck and conveyed into a collection bag through a chute in the mower deck. Alternatively, clippings can be mulched by cutting the grass clippings into very small pieces by circulating the clippings inside the cutting deck. These small pieces then fall down between the blades of grass, where the clippings can decompose.

Mowers exist that can switch between bagging and mulching. Because the clippings are physically transported differently when bagging or discharging than when mulching—downward toward the ground in the case of mulching, and out of the cutting deck when bagging—a configuration that is optimal for one mode may not be optimal for the other mode.

SUMMARY

One general aspect includes a cutting deck supporting a cutting blade that is rotatable around a substantially vertical axis, the cutting blade having a fixed blade sail. The cutting deck also includes an opening in the cutting deck through which grass clippings can pass. The cutting deck also includes a collection bag configured to receive grass clippings that pass through the opening in the cutting deck. The cutting deck also includes a door having a first position in which the door covers the opening, and a second position in which the door does not cover the opening. The cutting deck also includes a switch configured to send a mode signal indicating that the door is in the first position or the second position. The cutting deck also includes a trip affixed to the mower, the trip configured such that a change in door position causes the trip to be sensed by the switch. The cutting deck also includes a controller configured to receive the mode signal and adjust the cutting blade to rotate at a first speed when the mode signal indicates that the door is in the first position, and a second speed when the mode signal indicates that the door is in the second position. The cutting deck also includes an electric battery operable to power rotation of the cutting blade at the first speed and at the second speed.

Implementations may include one or more of the following features. The mower where the cutting blade has a medium blade sail height of 1.5 inch (38 mm) or less. The mower where the first speed is lower than the second speed. The mower where the first speed is between about 2200 and 2400 rotations per minute, and the second speed is between about 2600 and 2800 rotations per minute. The mower where the second speed is a maximum speed of the mower. The mower where the first speed is a variable speed that varies within a speed range, where the second speed is higher than the speed range of the first speed, and where the controller is further configured to step up blade speed to the second speed in response to receiving the mode signal indicating that the door is in the second position. The mower where the mower is configured such that attaching the collection bag to the mower causes the trip to be sensed by the switch. The mower where the collection bag is removably attachable to the mower, and where a position of the door is independent of whether the collection bag is attached to the mower.

One general aspect includes a mower including: a cutting deck supporting a cutting blade that is rotatable around a substantially vertical axis, the cutting blade having a fixed blade sail; an opening in the cutting deck through which grass clippings can pass; a collection bag configured to receive grass clippings that pass through the opening in the cutting deck; a door adjacent to the opening, the door having a first position in which the door covers the opening, and a second position in which the door does not cover the opening; a handle configured to move the door between the first position and the second position; a switch configured to send a mode signal indicating that the door is in the first position or the second position; a controller configured to receive the mode signal and adjust the cutting blade to rotate at a first speed when the mode signal indicates that the door is in the first position, and a second speed when the mode signal indicates that the door is in the second position; and an electric battery operable to power rotation of the cutting blade at the first speed and at the second speed.

Implementations may include one or more of the following features. The mower where the handle and the door are an integrally formed unit. The mower where the switch is configured to be tripped by rotation of the integrally formed unit around a substantially horizontal axis. The mower further including a trip that triggers the switch to send the mode signal. The mower where the switch is a Hall effect sensor.

One general aspect includes a mower including: a cutting deck supporting a cutting blade that is rotatable around a substantially vertical axis, the cutting blade having a fixed blade sail; a motor controlling the cutting blade to operate at one of a first rate of speed and a second rate of speed; an electric battery configured to power the motor; an opening in the cutting deck through which grass clippings can pass; a collection bag configured to receive grass clippings that pass through the opening in the cutting deck; a door pivotably attached to the cutting deck, the door having a first configuration in which the door obstructs the opening and a second configuration in which the door does not obstruct the opening; a sensor fixedly attached to the mower, the sensor configured to send a mode signal based on a configuration of the door; and a controller configured to receive the mode signal and instruct the motor to operate the cutting blade at the first rate of speed or the second rate of speed based on the mode signal.

Implementations may include one or more of the following features. The mower where the door rests on top of the collection bag when the collection bag is attached to the mower and when the door is in the second configuration. The mower where the sensor is a Hall effect sensor. The mower where the first configuration corresponds to a mulch mode and the second configuration corresponds to a bagging mode. The mower further including a trip configured to trigger the sensor to send the mode signal. The mower where the trip is fixedly attached to the door. The mower where the sensor is a Hall effect sensor and the trip is a magnet.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

Figure 1:
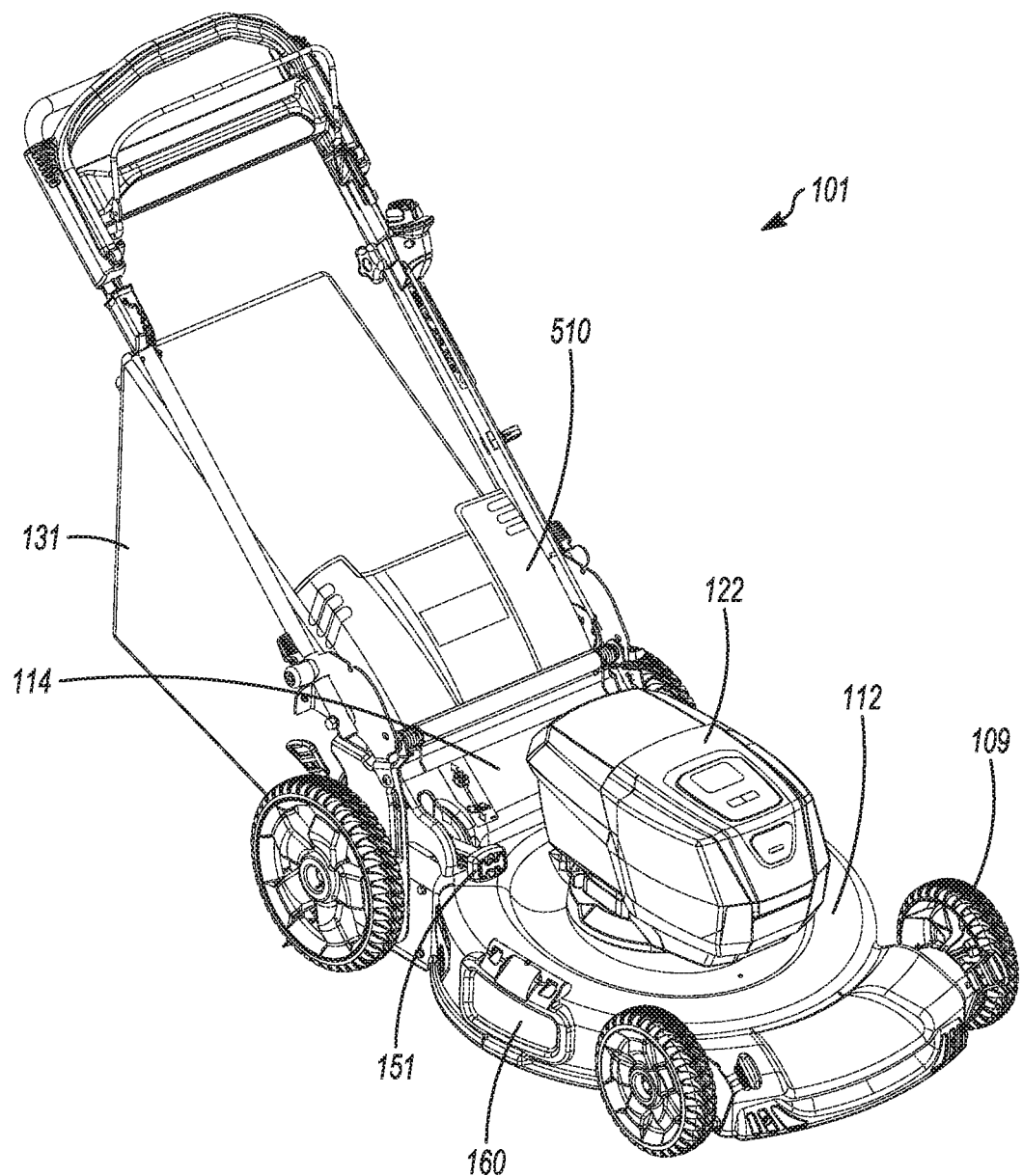
FIG. 1 is a perspective view of a first mower according to some examples.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

The technology described herein is appropriate for use with a battery-operated mower. Gasoline-powered engines typically include fuel reservoirs that hold more than enough fuel to power the engine for long periods of time. Therefore, power conservation is generally not a significant concern. In contrast, battery-powered engines are more limited in their energy storage capacity. A battery-powered mower generally has a shorter run time before there is a need to recharge the battery.

One of the factors affecting the amount of power drawn from the battery is engine speed, which translates to the speed of the cutting blade. A higher blade speed draws more power than a low blade speed. A lower blade speed can be appropriate when operating in mulch mode, in which grass clippings are recirculated through the cutting deck of the mower until they are cut into small enough pieces to be driven into the ground. A lower blade speed is less appropriate for bagging mode, where the grass clippings need to be ejected from the cutting deck. When the blade speed is too low, grass clippings are not efficiently propelled out of the cutting deck and into the collection bag. Increasing the speed of the cutting blade during bagging mode improves bagging performance.

Various examples of the disclosed technology provide a walk-behind rotary mower that is capable of automatically changing the speed of the cutting blade based on whether a mulch door is open or closed. If the mulch door is closed, the cutting blade rotates at a first speed. If the mulch door is open, the cutting blade rotates at a second, higher speed. The first configuration is a mulch mode in which the mulch door is closed and the cutting blade operates at a first speed. The second configuration is a bagging mode in which the mulch door is open and the cutting blade operates at a higher speed. By using a lower speed in mulch mode, power is conserved and mowing time is extended. By using a higher speed when the grass clippings need to be ejected from the cutting deck in bagging mode, better performance is provided.

The cutting blade speed is controlled by a central controller. The controller receives a mode signal indicating that the mulch door is opened, and adjusts the speed of the engine in response to the mode signal to operate at the higher speed. In some examples, a sensor or switch attached to the mower detects whether the mulch door is open or closed. The words "sensor" and "switch" can be used interchangeably to mean a mechanism that receives an input and generates an output. The switch can be mechanical or electrical. In some examples, the switch is fixedly attached to the mower. The switch can be attached to the mulch door, or the switch can be attached to the body of the mower.

In some examples, the system further includes a trip, separate from the switch, that is configured to activate the switch. In some examples, the switch and the trip are attached to two different parts of the mower, and relative motion of the trip with respect to the switch causes the switch to sense the trip. The trip can be attached to the mower or to the mulch door. The trip can be attached to the mulch door while the switch is attached to the mower near the mulch door. This arrangement allows electrical wiring to the switch located on the mower and avoids the complication of wiring to a moveable mulch door, in situations where the trip does not require wiring. It is also possible for the switch to be attached to the mulch door while the trip is attached to the mower near the mulch door. It is also possible for the switch and trip to be attached to other parts of the mower besides the mulch door and near the mulch door.

Control and Power System for a Mower

Figure 11:
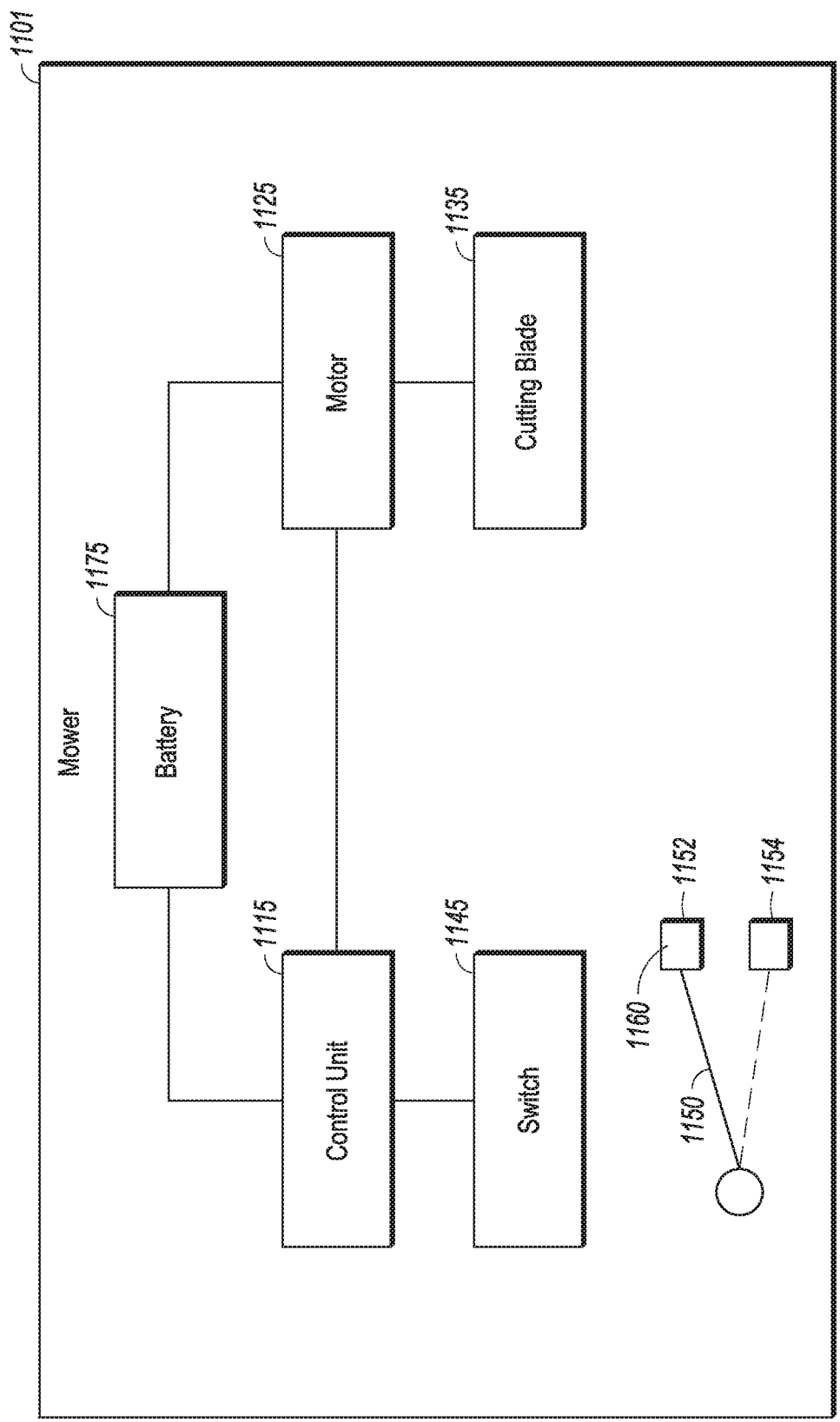
FIG. 11 is a schematic view of a control system for a mower according to some examples.

FIG. 11 is a schematic view of a control system for a mower according to some examples. The system 1101 includes a control unit 1115 that coordinates operation of the system 1101. A motor 1125 drives a cutting blade 1135 which has a sharpened cutting edge. Options for driving the blade include directly by an output shaft from the motor, a hydraulic motor, or through a belt and pulley system to a blade hub. The motor 1125 is capable of driving the cutting blade 1135 at different desired speeds. The control unit 1115 is configured to receive a mode signal from a switch 1145 that indicates whether a mulch mode or a bagging mode is required. In response to the mode signal, the control unit 1115 sets the cutting blade 1135 speed to the desired speed. In some examples, the system 1101 is powered by a battery, 1175. The battery 1175 is a rechargeable electric battery in some examples. The battery 1175 can be a single- or multiple-cell battery pack, such as a lithium ion battery pack.

A mulch door 1150 is moveable between a first position 1152 and a second position 1154. The mulch door includes a trip 1160 configured to activate the switch 1145 to indicate whether the mulch door is closed or open. If the mulch door is closed and the mower is in a mulching mode, the cutting blade rotates at a first speed. If the mulch door is open and the mower is in a bagging mode, then the cutting blade rotates at a second, higher speed. By using a lower speed in mulch mode, power is conserved and mowing time is extended. By using a higher speed when the grass clippings need to be ejected from the cutting deck in bagging mode, better bagging performance is provided.

Examples of mowers with this type of control arrangement are described herein. Any of the mowers and control arrangements described herein may also be used with gas-powered mowers having a gas motor, resulting in fuel being conserved in the mulching mode and the time between refilling a gas tank being extended.

Mower of FIG. 1-6

Now referring to FIGS. 1-6, mower 101 is one example of a mower capable of automatically switching between a first speed when a mulch door is closed and a second, higher speed when a mulch door is open. Mower 101 has a cutting deck 112 supporting and enclosing the rotating cutting blade. Mower 101 further has a rear housing 114 attached to a rear side of the cutting deck 112. Mower 101 is supported by a plurality of wheels 109. The mower 101 is powered by an electric, rechargeable battery housed within the engine housing 122. The mower 101 can be propelled by a rear wheel drive, a front wheel drive, or an all-wheel drive.

Figure 2:
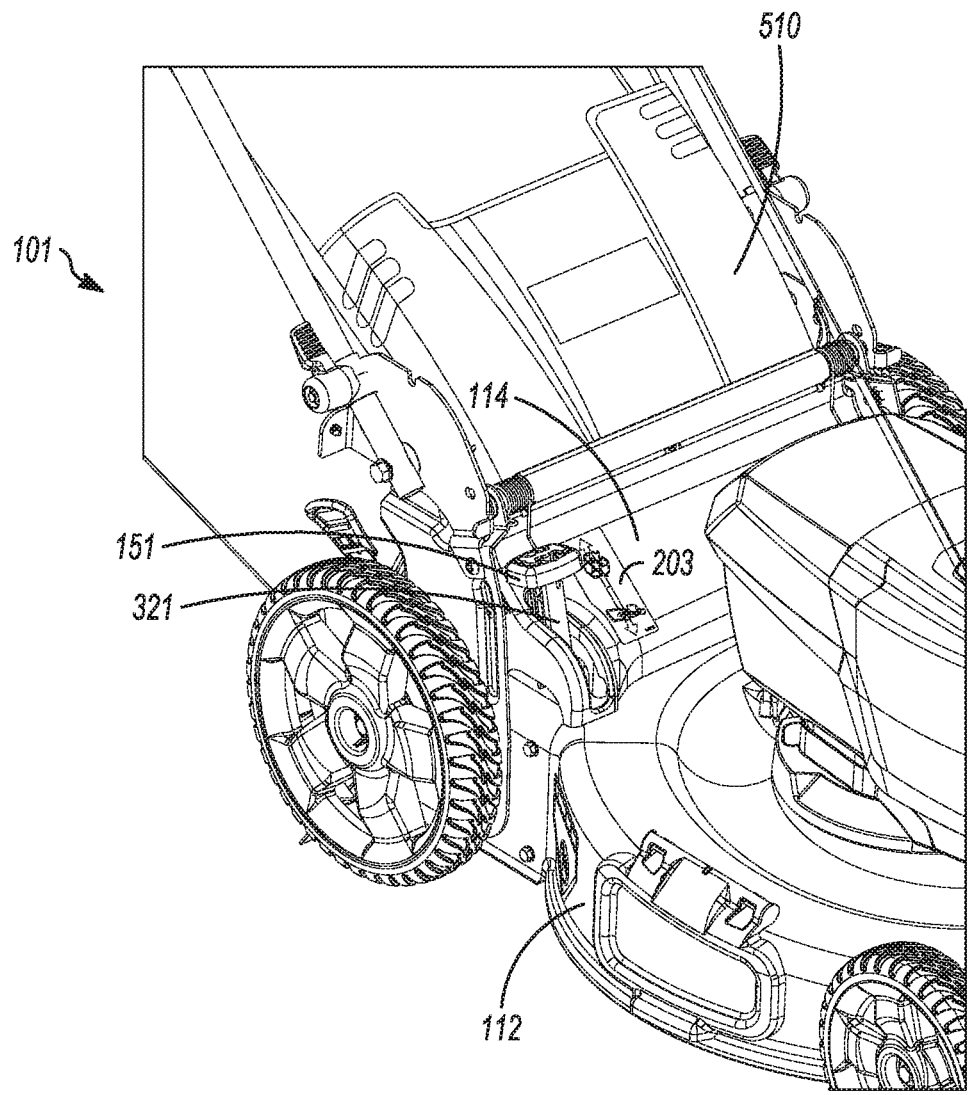
FIG. 2 is a perspective view of the mower of FIG. 1 according to some examples.

A collection bag 131 is configured to receive grass clippings through an opening in the cutting deck 112. In some examples, the collection bag 131 is removeable, and can be easily attached to and detached from the mower 101. A mulch door handle 151 is provided to switch the configuration of the mower 101 from a bagging mode to a mulching mode. FIG. 1 shows the mulch door handle 151 in a lowered orientation corresponding to a bagging mode in which grass clippings are conveyed from the cutting deck 112 through an opening in the cutting deck and into the collection bag 131. In FIG. 2, the mulch door handle 151 is in an upright orientation corresponding to a mulch mode, in which grass clippings are circulated within the cutting deck 112 and chopped into a fine mulch that falls toward the ground. The handle 151 is graspable by the user to move between a mulch mode and a bagging mode. A mode label 203 is included in some examples to indicate to the user which mode is selected and includes indicia, such as words, symbols, representations, or drawings, to convey each mode. For example, the mode label 203 includes a recycling symbol to indicate the mulching mode and a representation of a collection bag on a mower to indicate the bagging mode.

Figure 3:
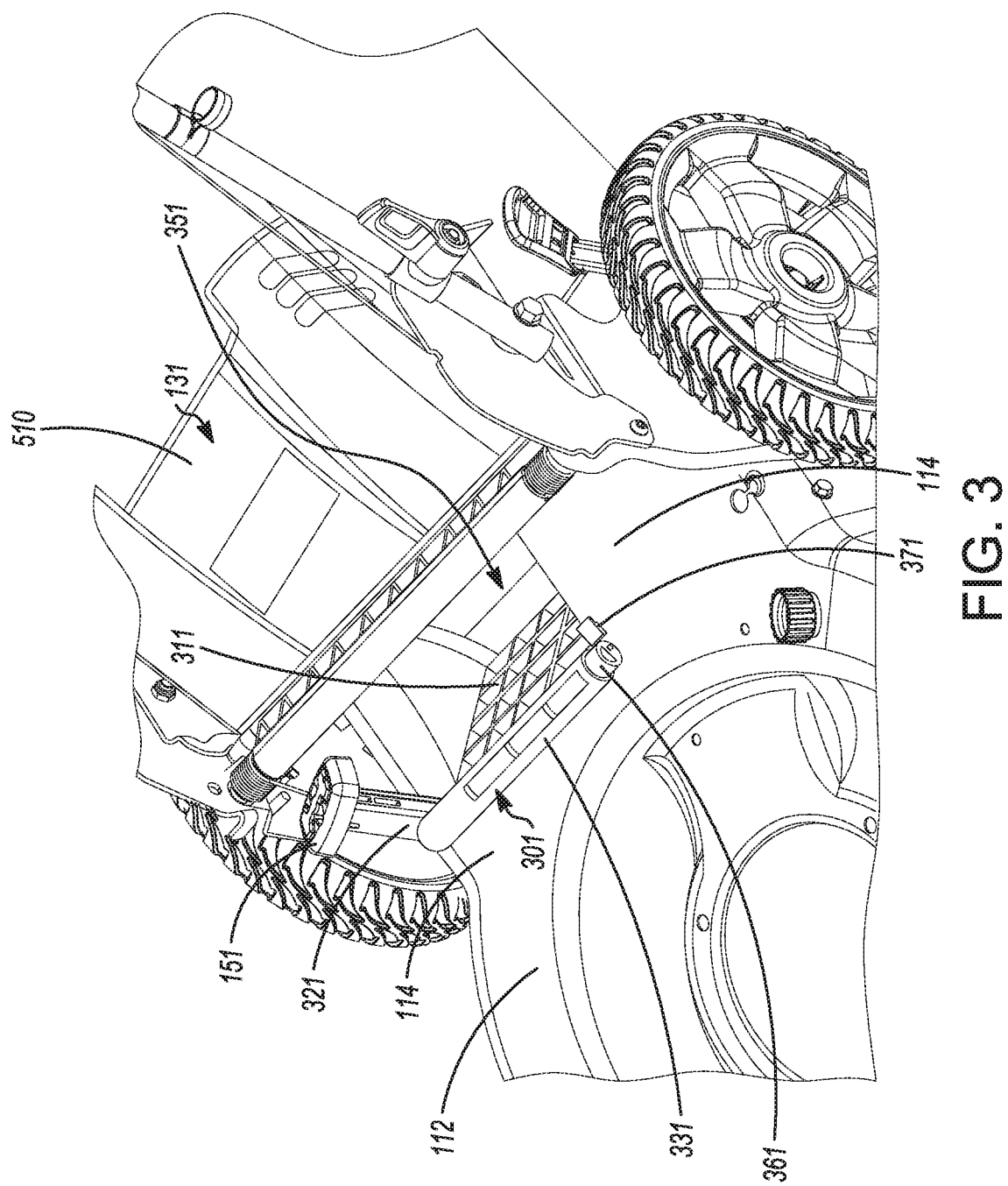
FIG. 3 is a cutaway view of the mower of FIG. 1 showing a mulch door of the first mower according to some examples.

FIG. 3 is a cutaway view of the mower 101 in the mulch configuration, where a portion of rear housing 114 is cut away to provide a view of the mulch door 311 connected to the mulch door handle 151. In the example of FIG. 3, the mower 101 can be put into mulch mode or bagging mode based on the configuration of a mode switch unit 301. The mode switch unit 301 includes an door 311 and a lever arm 321 attached to the door 311 by a shaft 331. The mode switch unit 301 is configured to rotate around an axis of the shaft 331. In some examples, the axis of the shaft 331 is substantially horizontal. In some examples, the door 311, lever arm 321, and shaft 331 are integrally formed. An opening in the cutting deck 112 leads to a discharge passage 351. The discharge passage 351 is defined by the rear assembly 114. In bagging mode, grass clippings are allowed to exit the cutting deck 112 through the passage 351 and into the collection bag 131.

Figure 5:
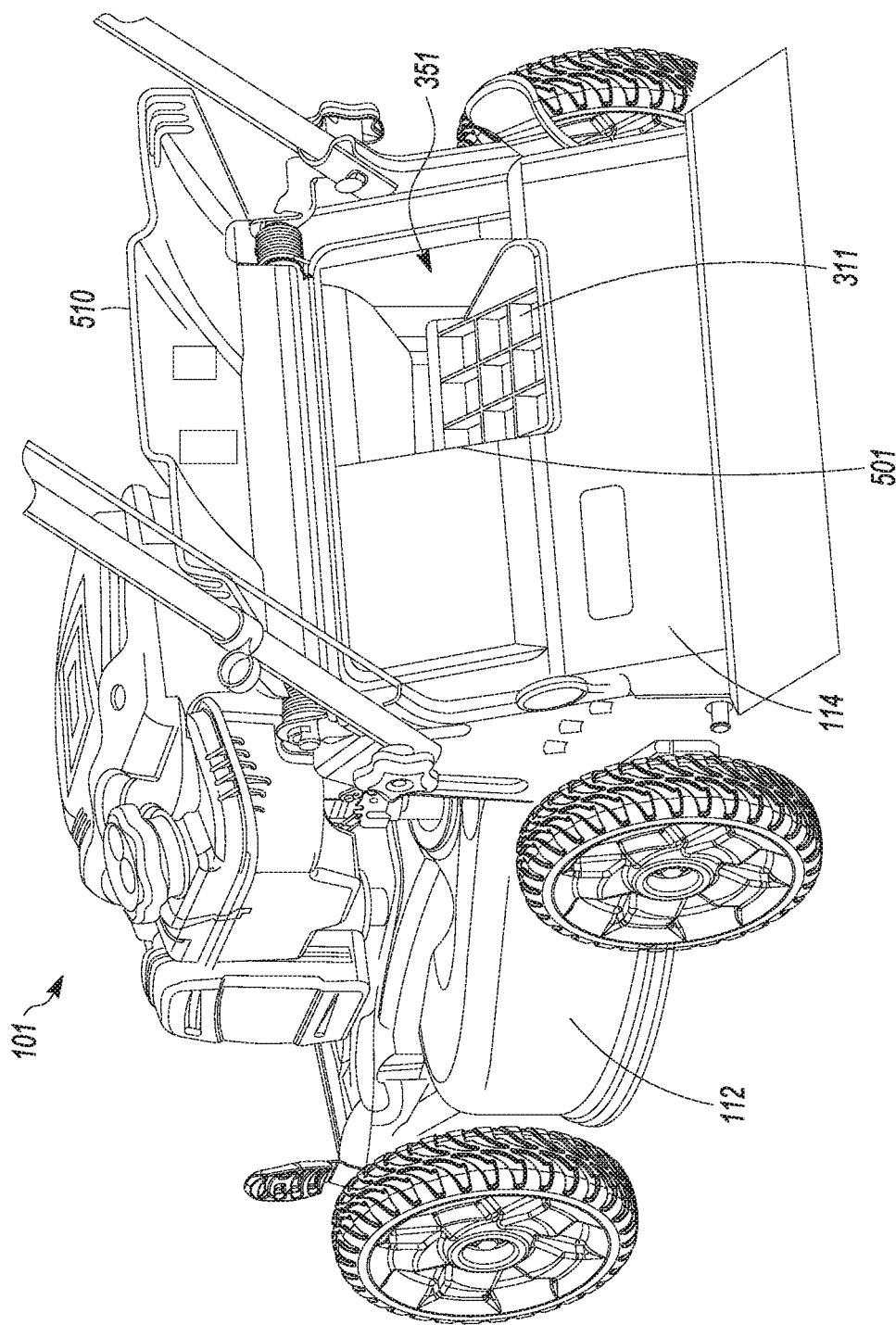
FIG. 5 is a rear view of the mower of FIG. 1 according to some examples.

FIG. 5 shows a rear view of the mower 101. The discharge passage 351 leads from the opening in the cutting deck to a rear housing opening 601. In the view of FIG. 5, the door 311 is in a first closed position, blocking the opening from the cutting deck and into the discharge passage 351. The view of FIG. 5, therefore, shows the mower 101 in mulch mode. In bagging mode, the door 311 would be in a second open position, with the mode switch unit oriented upward to unblock the opening in the cutting deck leading to the passage 351, allowing grass clippings to exit the opening in the cutting deck 112, enter the discharge passage 351, and enter the collection bag 131.

A rear door 510 is visible in FIG. 5, in an open position uncovering the rear housing opening 601. The rear door 510 is also visible in FIG. 1. The rear door 510 can rotate between a closed position covering the rear housing opening (not shown) and the open position shown in FIG. 5. In some examples, the rear door 510 is spring-biased into the closed position. In some examples, the rear door 510 has a width in the same direction as its axis of rotation of at least about 10 inches (25 cm), at most about 20 inches (51 cm), or about 15 inches (38 cm). In some examples, the rear door 510 has a length in a direction extending away from and perpendicular to its axis of rotation of at least about 6 inches (15 cm), at most about 10 inches (25 cm), or about 8 inches (20 cm).

Figure 4:
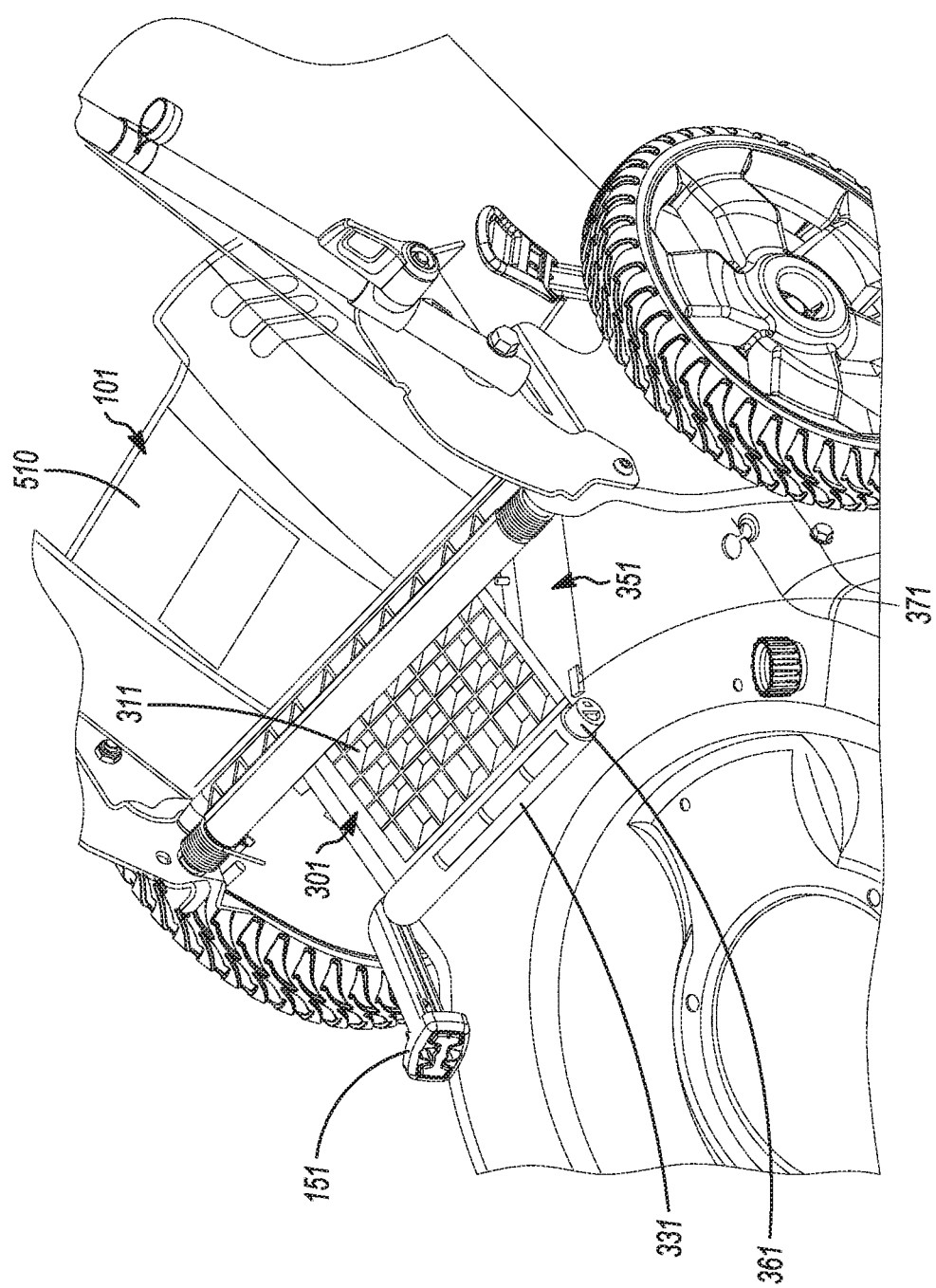
FIG. 4 is a cutaway view of the mower of FIG. 1 showing the mulch door of FIG. 3 according to some examples.

The mode switch unit 301 can be made of a hard polymer, such as HDPE (high density polyethylene). The mode switch unit 301 is attached to the rear housing 114, such as to a wall of the discharge passage 351. In some examples, the shaft 331 can be seated in brackets on the top of the rear housing 114. In other examples, the mode switch unit 301 can be attached to the cutting deck 112. In some examples, the shaft 331 can be seated in brackets on the top of the cutting deck 112. The shaft 331 is rotatable around an axis. The door handle 151 is controlled by a user by applying force on the lever arm 321. The force on the lever arm 321 causes rotation of the shaft 331, and rotation of the door 311 inside of the passage 351. When the door handle 151 is in an upright orientation (as in FIG. 1), the mower is in a mulching mode and the door 311 of the mode switch unit 301 is in a first position blocking the opening through the cutting deck, preventing grass clippings from exiting the cutting deck 112 and entering the passage 351. When the door handle 151 is in a lowered orientation (as in FIG. 2), the door 311 is in a second position that does not block the opening in the cutting deck. FIG. 4 is a cutaway view of the mower 101 similar to FIG. 3 except the mode switch unit 301 is in the bagging configuration. In this configuration, grass clippings can be propelled through the passage 351 into the collection bag 131.

The physical orientation of the mode switch unit 301 determines whether the mower 101 is in bagging mode or mulching mode. When the lever arm 321 of the door handle 151 is raised, the door 311 is lowered and blocks the opening to the passage 351, causing the mower 101 to operate in mulch mode. When the lever arm 321 of the door handle 151 is lowered, the door 311 is raised and no longer blocks the opening to the passage 351, causing the mower 101 to operate in bagging mode. The door 311 is located at the end of the passage 351 closest to the cutting blade, blocking the opening from the cutting deck 112. The door 311 has a substantially rectangular shape corresponding to the shape of the opening in the cutting deck. A thickness of the door 311 is much less than its width or length, such as about 25% or less, as the door serves to block the opening to the cutting deck but does not need to occupy the passage 351.

The door 311 can be constructed using a waffle structure as shown in FIGS. 3-4 to increase the strength and decrease the weight. In some examples, the door 311 has a width in the same direction as the shaft 331 of at least about 4 inches (10 centimeters (cm)), at least about 5 inches (13 cm), at least about 6 inches (15 cm), at least about 7 inches (18 cm), at least about 8 inches (20 cm), at most about 10 inches (25 cm), at most about 9 inches (23 cm), and at most about 8 inches (20 cm). In some examples, the door 311 has a width of at least about 6 inches (15 cm) and at most about 9 inches (23 cm).

In some examples, the door 311 has a length in a direction extending away from and perpendicular to the shaft 331 of at least about 5 inches (13 cm), at least about 6 inches (15 cm), at least about 7 inches (18 cm), at least about 8 inches (20 cm), at least about 9 inches (23 cm), at least about 10 inches (25 cm), at most about 9 inches (23 cm), and at most about 10 inches (25 cm), at most about 11 inches (28 cm). In some examples, the door 311 has a length of at least about 8 inches (20 cm) and at most about 10 inches (25 cm).

Referring now to FIGS. 1 and 3, only the handle 151 and a portion of the lever arm 321 of the mode switch unit 301 are visible from a top, side or front view of the mower 101 above the rear housing 114. The remainder of the mode switch unit 301, including a lower part of the lever arm 321, the shaft 331 and the mulch door 311, are hidden under the rear housing 114.

FIG. 3 shows the mulch door 311 in a closed position and the collection bag 131 attached to the mower 101. The mower 101 can be conveniently switched between the mulching mode and the bagging mode independently of whether the collection bag 131 is attached using the handle 151, so that a user does not need to remove the collection bag in order to switch from a bagging mode to a mulching mode and thereby saves steps.

A switch 371 is provided to sense the orientation of the mode switch unit 301, and a trip 361 is provided to cause switching of the switch 371 to indicate which mode is being used. In the example of FIGS. 3-4, the switch 371 is fixedly attached to the cutting deck 112, and the trip 361 is fixedly attached to the moveable mode switch unit 301. In particular, the trip 361 is attached to the rotatable shaft 331. When the lever arm 321 is rotated around the horizontal axis of the shaft 331, the trip 361 also rotates around the horizontal axis, resulting in a change in distance between the trip 361 and the switch 371. The switch 371 senses this change in the relative position of the trip 361 and interprets the change as a mode signal to change from bagging mode to mulch mode or vice versa.

In one example, the switch 371 is a Hall effect sensor and the trip 361 is a magnet. In this example, the magnet is sensed by the Hall effect sensor. As discussed in relation to FIG. 11, a mode signal from the switch 371 is sent to a control unit to indicate the change from bagging mode to mulch mode or vice versa.

In an alternative embodiment, a trip is located on the lever arm 321 and the switch is near a first position of the lever arm 321 or a second position of the lever arm 321.

In use, the mower 101 can be switched from mulch mode to bagging mode as follows. Starting with the door handle 151 in an upright orientation as shown in FIG. 3, the trip 361 is in a first position at a first distance from the switch 371. A user applies torque to the lever arm 321 to cause the mode switch unit 301 to rotate around the horizontal axis of the shaft 331. This in turn causes the door 311 to swing upward, allowing the opening of the cutting deck 112 to be unblocked, as demonstrated in FIG. 4. Switch 371 remains stationary as the mode switch unit 301 is converted from mulch mode to bagging mode. The trip 361 rotates around the horizontal axis along with the lever arm 321, moving into a second position at a second distance from the switch 371, where the second distance is smaller than the first distance. The switch 371 detects the change in position of the trip 361 and generates a mode signal indicating the change. The mode signal is sent to a controller, described in relation to FIG. 11. There are many different options for the detection and control scheme that are further described herein.

Figure 6:
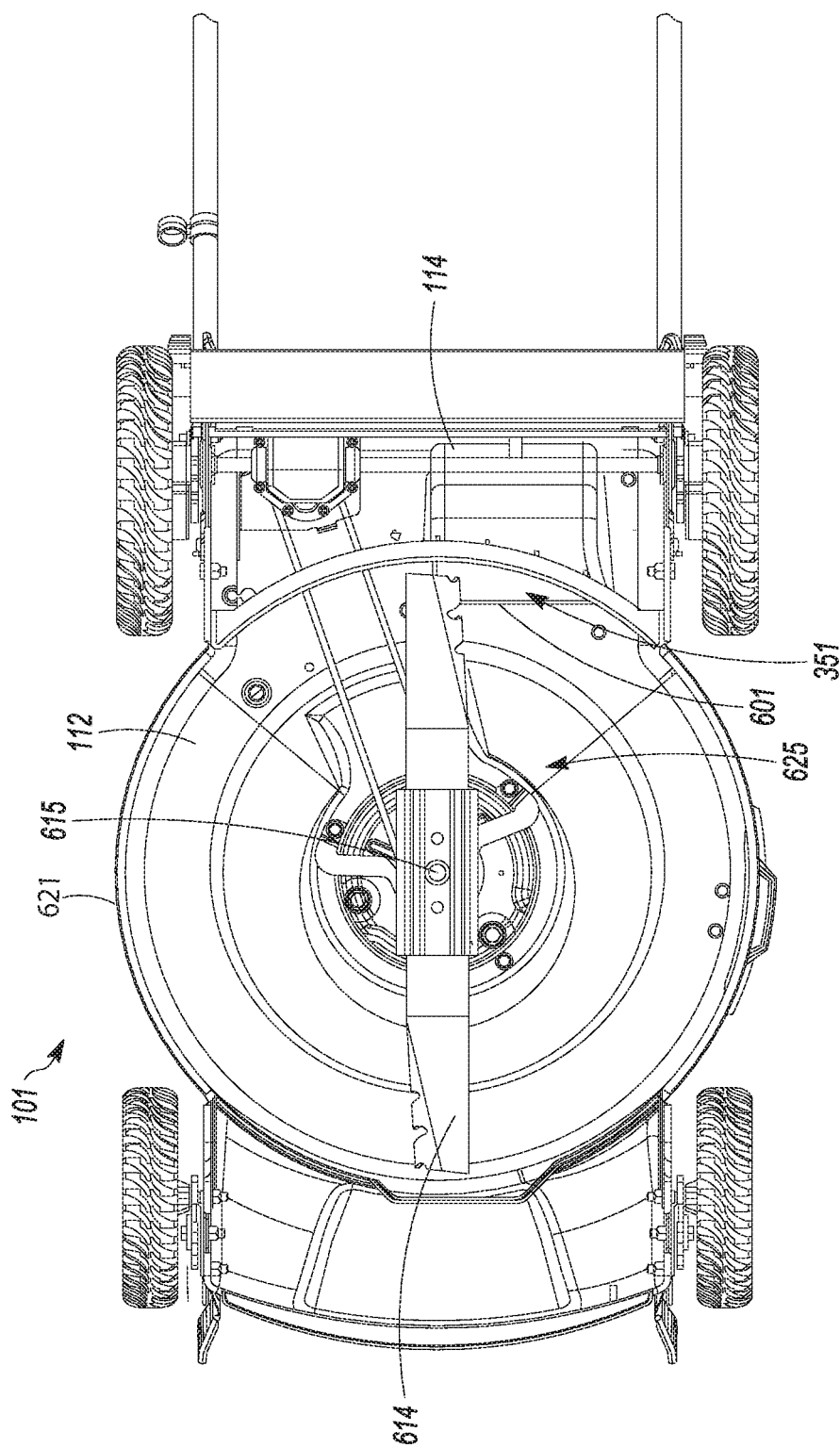
FIG. 6 is a bottom view of the mower of FIG. 1 according to some examples

FIG. 6 shows a bottom view of the mower 101. This view shows the cutting deck 112 supporting a cutting blade 614 that is rotatable around a substantially vertical axis, represented by axis 615. In some examples, the cutting blade has a fixed blade sail, which are described in relation to FIGS. 12-13. A wall 621 of the cutting deck 112 defines an interior cavity 625 that houses the cutting blade 614. The discharge passage 351 leads from an opening 601 in the cutting deck 112 to the opening 501 in the rear housing 114. When the mode switch unit 301 is in the mulch configuration, clippings do not leave the interior cavity 625, and are forced downward into the ground. When the mode switch unit 301 is in the bagging configuration, grass clippings are thrown from the interior cavity 625 through the opening 601, into the passage 351, and into a collection bag 131.

Mower of FIGS. 7-10

Figure 7:
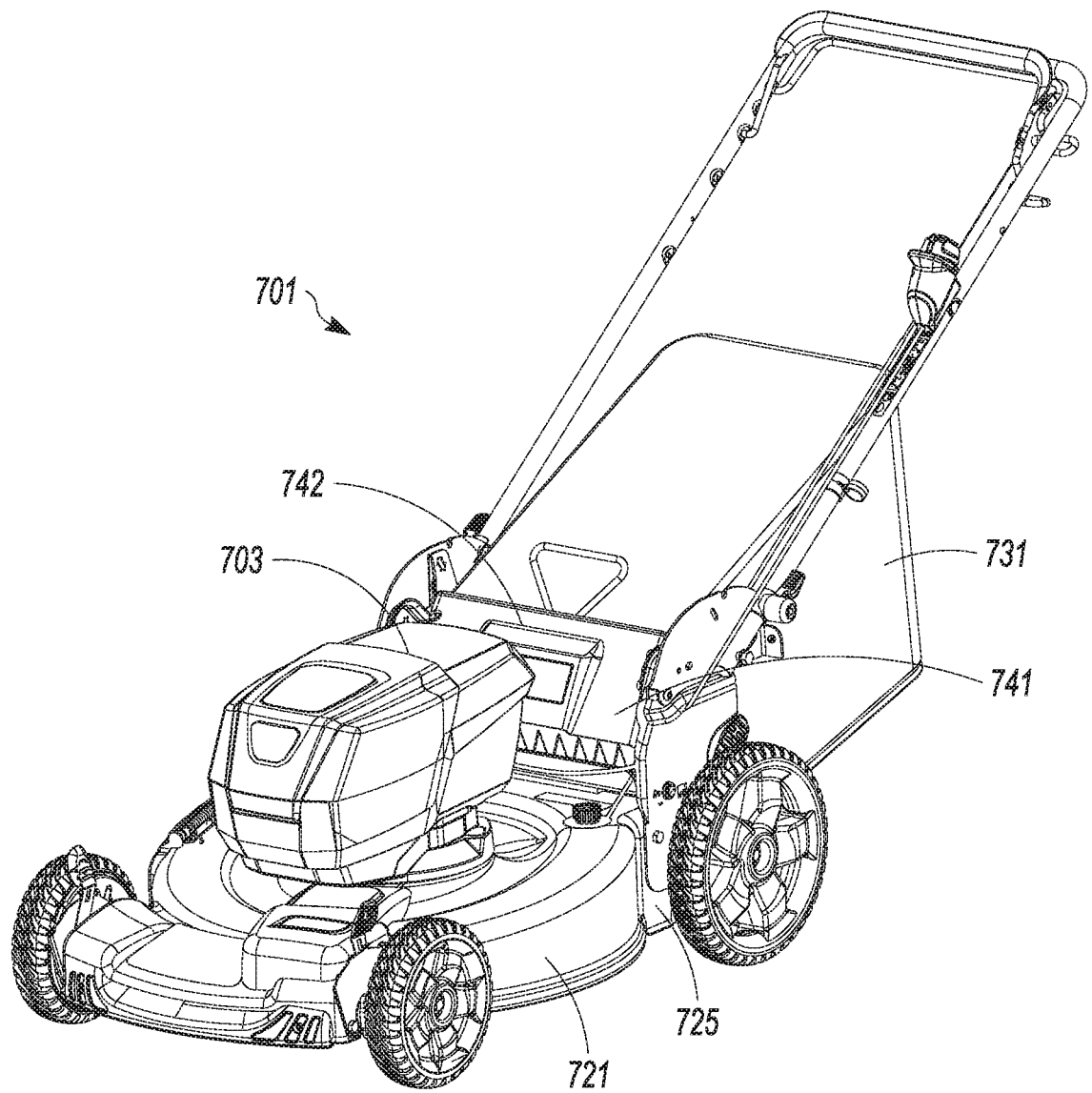
FIG. 7 is a perspective view of a second mower according to an alternative example.

In an alternative example of a mower according to some examples shown in FIGS. 7-10, a mower is capable of switching between a mulch mode and a bagging or discharge mode and automatically adjusting between a first speed when a mulch door is closed and a second, higher speed when a mulch door is open. In FIG. 7, a mower 701 includes a cutting deck 721 and a motor housing 703 to house a motor for the mower 701. The cutting deck 721 surrounds the rotating cutting blade and is attached to a rear housing 725. Wheels support the mower. The mower 101 can be propelled by a front wheel drive, a rear wheel drive, or an all-wheel drive.

Figure 8:
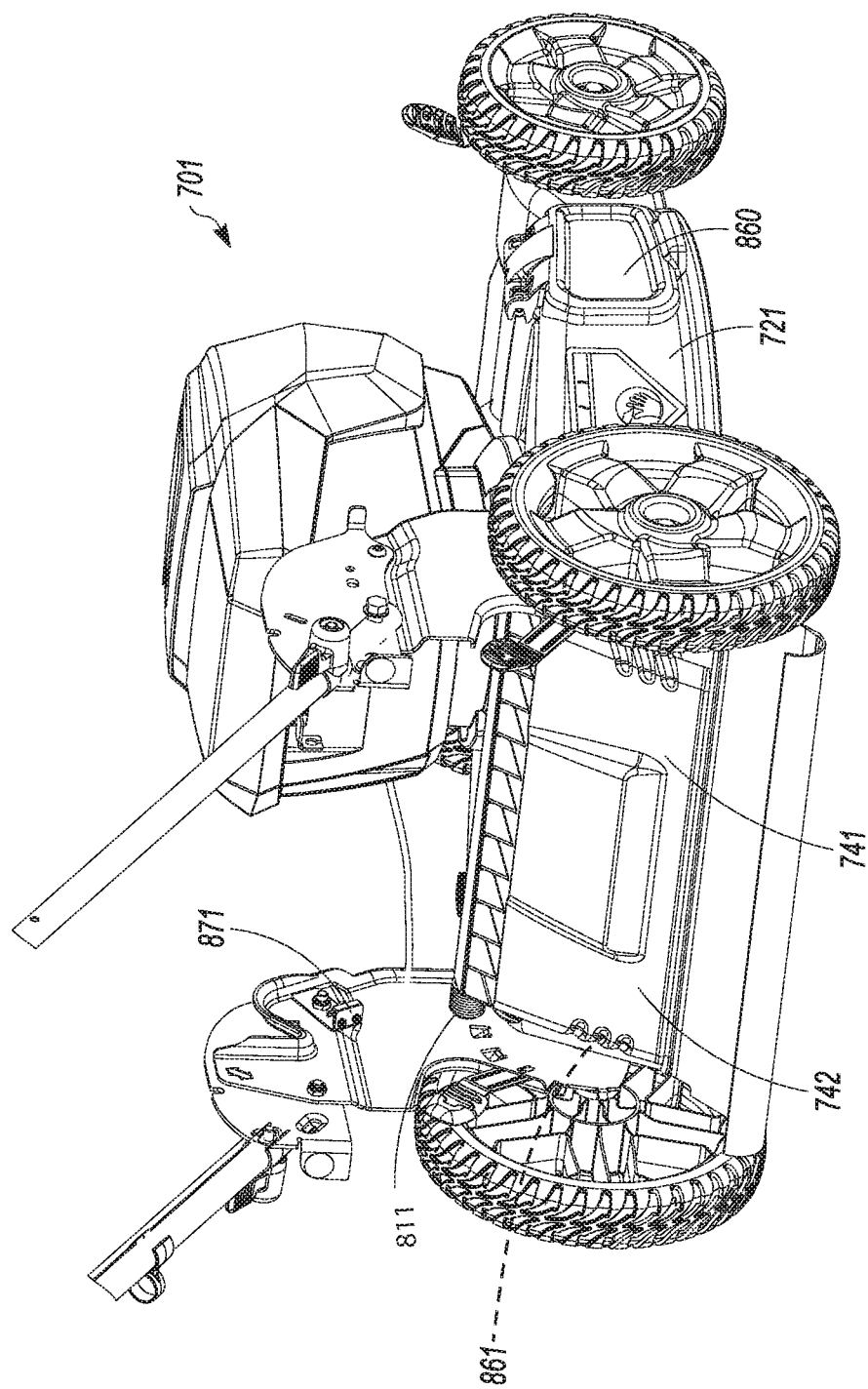
FIG. 8 is a rear view of the mower of FIG. 7 according to some examples.

The mower 701 includes a removable collection bag 731. The mower 701 includes a mulch door 741 in an open position so that grass clippings can enter the collection bag 731. The mulch door 741 is visible from the top, front, and side views of the mower 701 when the mower is in a bagging mode. FIG. 8 is a rear view of the mower 701 in which the mower 701 is configured for mulch mode with a mulch door 741 closed and without the collection bag 731. The mulch door 741 is visible from the rear view when the mower is in a bagging mode. The mulch door is not covered by the rear housing 725.

Figure 9:
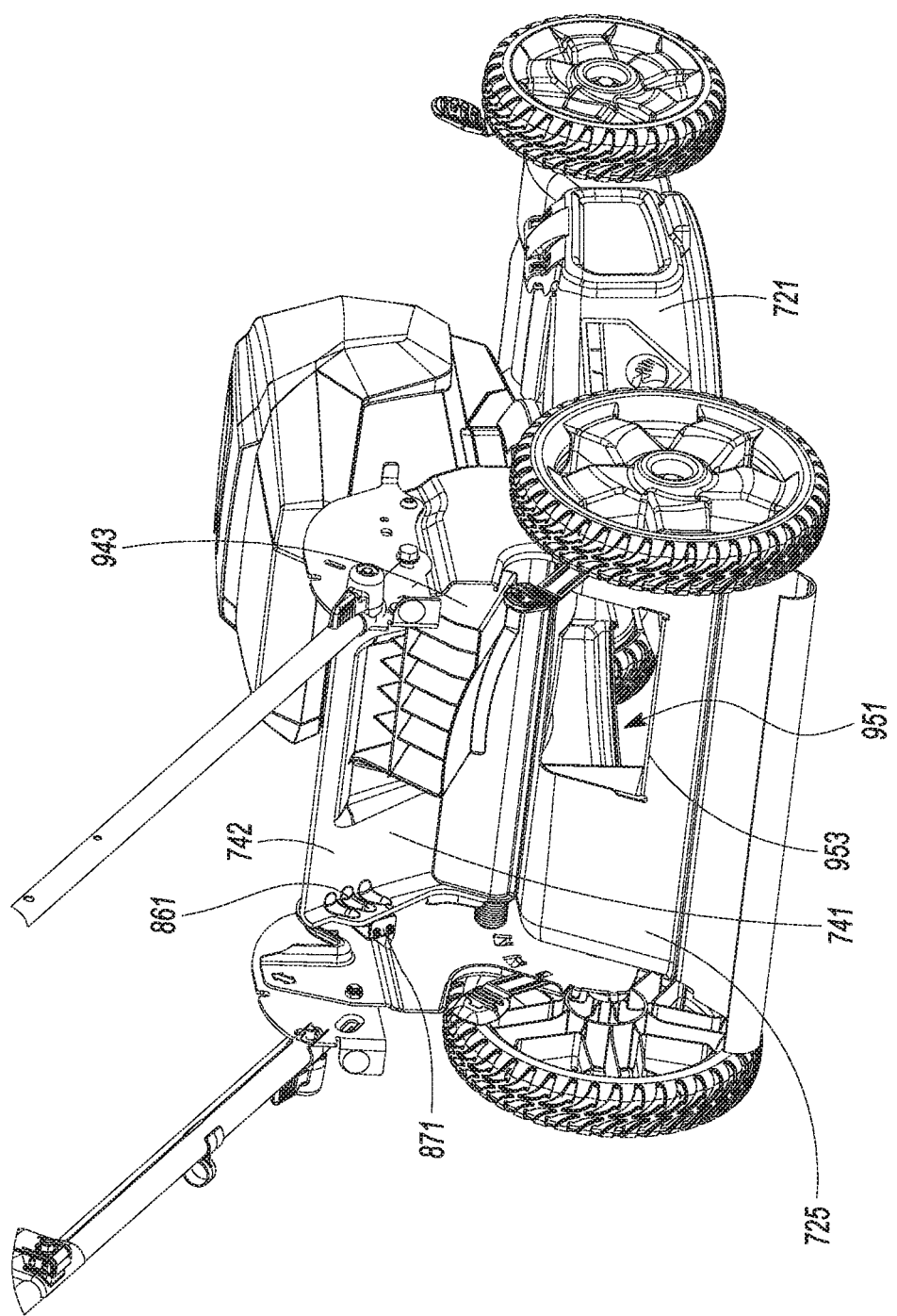
FIG. 9 is a rear view of a mulch door of the second mower according to some examples.

FIG. 9 is a rear view of the mower 701 in which the mower 701 is configured for bagging, with the mulch door 741 open. In the view of FIG. 9, the collection bag is not present in order to facilitate explanation of the system.

However, during use in bagging mode, the collection bag 731 would be attached to the rear of the mower, as seen in FIG. 7.

Turning now to FIGS. 8-9, the mower 701 can be converted between mulch mode and bagging mode by changing the orientation of a mulch door 741 that includes a door flap 742 and a mulch plug 943. The mulch plug 943 is integral with the mulch door 741. The mulch plug 943 is sized to fit within an passage 951 that leads from an interior of the cutting deck 721 to a rear housing opening 953. The mulch door 741 is rotatable around a substantially horizontal axis defined by a shaft 811.

FIG. 8 shows the mower 701 in mulch mode, in which the mulch door 741 covers the passage 951. In mulch mode, the mulch plug 943 sits within the passage 951, blocking any grass clippings from leaving the interior cavity of the cutting deck 721. FIG. 9 shows the mower 701 in bagging mode, in which the mulch door 741 does not cover the passage 951. Converting the mower 701 from mulch mode to bagging mode involves the step of removing the mulch plug 943 from the passage 951 by lifting the door flap 742, causing the mulch door 741 to rotate around the substantially horizontal axis defined by shaft 811.

In some examples, the mulch door 741 has a width in the same direction as its axis of rotation of at least about 10 inches (25 cm), at most about 20 inches (51 cm), or about 14 inches (36 cm). In some examples, the mulch door 741 has a length in a direction extending away from and perpendicular to its axis of rotation of at least about 6 inches (15 cm), at most about 10 inches (25 cm), or about 8 inches (20 cm).

The mulch plug 943 of the mulch door 741 can be constructed using a waffle structure as shown in FIG. 9 to increase the strength and decrease the weight. In some examples, the mulch plug 943 has a width in the same direction as the shaft 811 of at least about 4 inches (10 centimeters (cm)), at least about 5 inches (13 cm), at least about 6 inches (15 cm), at least about 7 inches (18 cm), at least about 8 inches (20 cm), at most about 10 inches (25 cm), at most about 9 inches (23 cm), and at most about 8 inches (20 cm). In some examples, the mulch plug 943 has a width of at least about 6 inches (15 cm) and at most about 9 inches (23 cm).

In some examples, the mulch plug 943 has a length in a direction extending away from and perpendicular to the shaft 811 of at least about 5 inches (13 cm), at least about 6 inches (15 cm), at least about 7 inches (18 cm), at least about 8 inches (20 cm), at least about 9 inches (23 cm), at least about 10 inches (25 cm), at most about 9 inches (23 cm), and at most about 10 inches (25 cm), at most about 11 inches (28 cm). In some examples, the mulch plug 943 has a length of at least about 8 inches (20 cm) and at most about 10 inches (25 cm).

Now referring to FIG. 9, the mulch door 741 is attached to an exterior surface of the rear housing 725. The attachment location of the mulch door 741 is near the rear housing opening 953, which is at the end of the passage 951 furthest from the cutting blade. The mulch door 741 is not attached to the cutting deck 721.

A switch 871 is attached to the mower. In the example of FIG. 8, the switch 871 is fixedly attached to one side of the mower. Other locations for the switch are possible, however. A trip 861 is attached to the mower. In the example of FIG. 8, the trip 861 is fixedly attached to the door flap 742, but other locations are possible. In the embodiment shown in FIGS. 8-9, the trip 861 is located on the underside surface of the door flap 742 visible in FIG. 9. The trip may alternatively be located on the outside surface of the door flap 742 visible in FIG. 8 or can be embedded in the material of the door flap 742. The switch 871 and trip 861 are positioned such that when the door flap 742 is in the mulch configuration seen in FIG. 8, the switch 871 and the trip 861 are in a first position, spaced apart by a first distance. When the door flap 742 is in a bagging or discharge configuration, seen in FIG. 9, the switch 871 and the trip 861 are in a second position, spaced apart by a second distance less than the first distance. The switch can detect the change in position of the trip from the first position to the second position. In the example of the figures, lifting the door flap 742 to convert the mulch door from mulch mode to bagging mode causes the trip 861 to move between the first position at the first distance from the switch 871 to the second position at the second distance from the switch 871. In some examples, the switch 871 is a Hall effect sensor, and the trip 861 is a magnet.

In use, the mower 701 can be switched from mulch mode to bagging mode as follows. Starting with the mulch door 741 in the mulch door configuration in FIG. 8, the door flap 742 is lifted upward, which reveals the passage 951. The magnet of the trip 861 approaches the Hall effect sensor of the switch 871, allowing the magnet to be detected by the Hall effect sensor. The sensor then sends a mode signal to a controller to indicate that the bagging mode is desired.

In the example of FIGS. 8-9, the switch 871 remains stationary and the trip 861 moves with the mulch door 741 as the mower 701 is converted from mulch mode to bagging mode. This arrangement allows electrical wiring to the switch 871 located on the mower and avoids the complication of wiring to the moveable mulch door 741, as the trip does not require wiring. In alternative configurations, the trip 861 could be stationary and the switch 871 could be attached to a moving part such as the mulch door 741.

Figure 10:
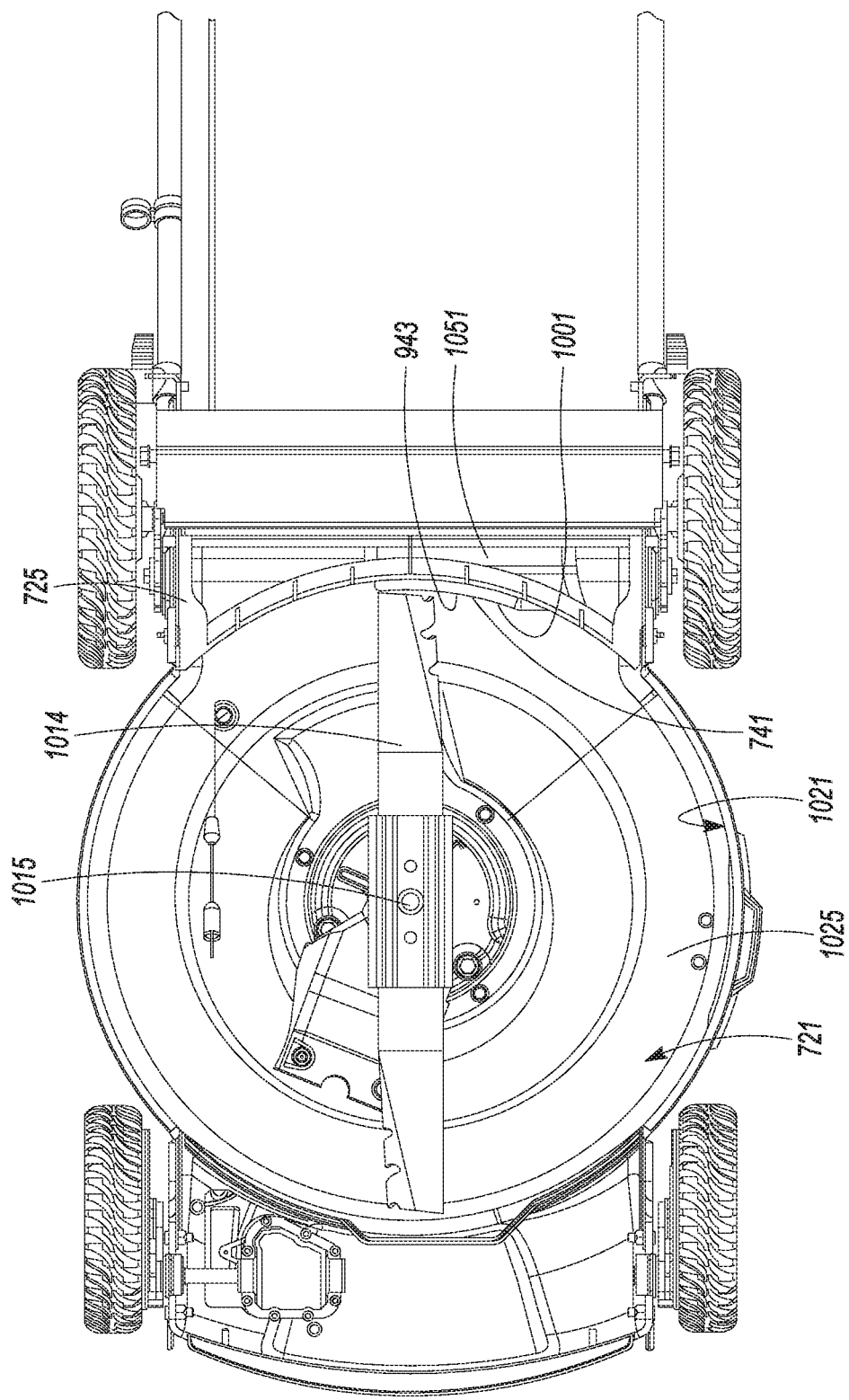
FIG. 10 is a bottom view of the mower of FIG. 7 according to some examples.

FIG. 10 shows a bottom view of the mower 701. This view shows the cutting deck 721 supporting a cutting blade 1014 that is rotatable around a substantially vertical axis, represented by axis 1015. In some examples, the cutting blade has a fixed blade sail, which are described in relation to FIGS. 12-13. A wall 1021 of the cutting deck 721 defines an interior cavity 1025 that houses the cutting blade 1014. An opening 1001 in the cutting deck 721 leads from the interior cavity 1025 to the passage 951 (not shown) defined by the passage housing 1051. When the mulch door 741 is in the mulch configuration, clippings do not leave the interior cavity 1025, and are circulated inside of the interior cavity 1025 and ultimately forced downward into the ground. When the mulch door 741 is open, grass clippings are thrown from the interior cavity 1025 through the opening 1001 and passage housing 1051 and deposited into a collection bag in bagging mode.

The plug 943 portion of the mulch door is visible in FIG. 10 closing off the opening 1001 to the passage housing 1051. The plug 943 occupies the passage 951 when the mulch door is closed. The presence of the plug 943 prevents air from swirling in the passage 951 when the mower is in the mulching mode, so that the airflow is more conducive to causing the blades of grass to stand straighter for cutting.

Switch and Trip Options

There are many options for a switch or a switch and a trip for use in the mower embodiments described herein. The output of the switch indicates to the controller if the trip is in a first position or a second position. In any of the examples described herein, the switch can be a Hall effect sensor and the trip can be a magnet. In these examples, the switch provides an output voltage proportional to the magnetic field strength through it. In one example, when the trip is in the second position, the switch outputs a voltage and when the trip is in the first position, the switch does not output a voltage. The output of the switch is used to determine whether the mulch door is open, when voltage is output by the switch, or closed, when no voltage is output by the switch.

In another example for a Hall effect sensor, when the trip is in the second position, the switch outputs a first voltage and when the trip is in the first position, the switch outputs a second, lower voltage. The output of the switch is used to determine whether the mulch door is open, when a voltage over a threshold voltage is output by the switch, or closed, when a voltage below a threshold voltage is output by the switch.

In some examples, the switch is an electronic switch that can be operated rapidly by a movement. In some examples, the switch is a momentary switch which is only engaged while it is in an activated position and is otherwise normally in an inactivated position. In some examples, the switch is a pressure switch or a magnetic switch.

These are just a few examples of the possible switch and switch and trip arrangements and control schemes.

Cutting Blade Speed Settings

In various examples, the motor of the mower can drive the cutting blade at different speeds based on the configuration of the mower. The cutting blade can have a first mulch mode speed in a mulching mode and an increased second bagging speed, higher than the first mulch mode speed, when the mulch door is open.

In some examples, the cutting blade can also have a variable range of speeds appropriate for different mowing conditions, such as wet grass or dry grass. A lower blade speed that is appropriate for dry, sparse turf may not efficiently cut heavy or wet turf because dry, sparse turf provides less resistance than turf that is heavy, wet, or both. The mulch mode speed in this example is variable based on turf condition. In some examples, the controller varies the cutting blade speed based on low or high resistance mowing conditions in the mulch mode configuration, while the bagging mode causes the blade to rotate at a maximum speed regardless of mowing conditions. In some examples, the high-resistance mulch mode speed is equal to the bagging speed. In some examples, both the high-resistance mulch mode speed and the bagging speed are the maximum, highest speed for the mower.

For example, an exemplary the cutting blade with a length of 21.75 inches (55.2 cm) can have variable speeds as measured by rotations per minute (RPM) in the range of 2200 RPM to 2900 RPM. In some examples, the cutting blade can operate at a narrow range of speeds as a step function, with a low speed set at a particular speed and a high speed set at a particular stepped-up speed that is higher than the low speed. For example, a first, lowest speed can corresponding to mulch mode in dry and low-resistance conditions.

In one example, the blade can have a lowest speed in the range of between about 2200 and about 2400 RPM, or about 2300 RPM (about 13,000 feet per minute for a 21.75 inch blade). At this lowest speed, the run time of the battery will be maximized when a higher speed is not needed to propel the clippings into the collection bag or deal with a heavier load.

An increased-load speed can correspond to mulch mode in lush, dense, or wet conditions which cause a heavier load. The heavier load on the blade from cutting is an input to the controller. In one example, the blade can have an increased-load speed in the range of between about 2600 and about 2800 RPM, or about 2700 RPM.

A highest speed can correspond to bagging mode, to have improved bagging of the grass clipping. In one example, the blade can have a highest speed that is in the range of about 2600 to about 2800 RPM, or about 2700 RPM (about 15,000 feet per minute for a 21.75 inch blade). An accepted safety limit for tip speed is 19,000 feet per minute (97 meter per second), which correlates to a speed of about 3300 RPM for a blade with a length of 21.75 inches (55.2 cm). In one embodiment, highest speed of the mower is about 3300 RPM. In one embodiment, the bagging speed for the mower is about 3300 RPM.

Cutting Blade Sail

FIGS. 12A-C and 13A-C show two examples of a cutting blade for a rotary mower. The sail of a cutting blade is a turned-up area opposite the cutting blade. Both the cutting edge and the sail contribute to the quality-of-cut. The sail is important because it causes air flow that pulls grass up straight, thereby producing an even cut.

Figure 12A:
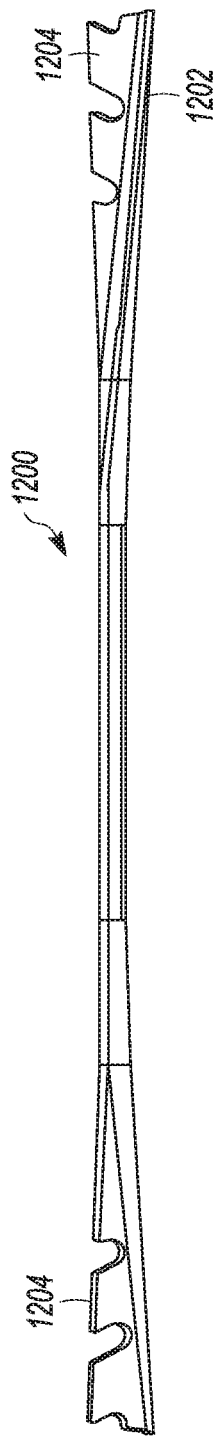
FIG. 12A is an isometric perspective view of a mower blade according to some examples.
Figure 12C:
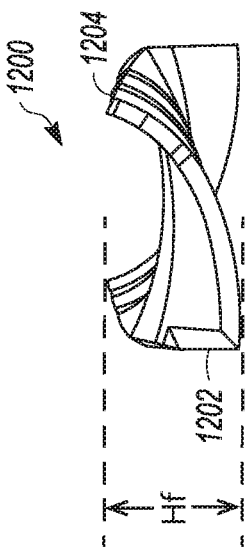
FIG. 12C is a side elevational view of the mower blade of FIG. 12A.
Figure 12B:
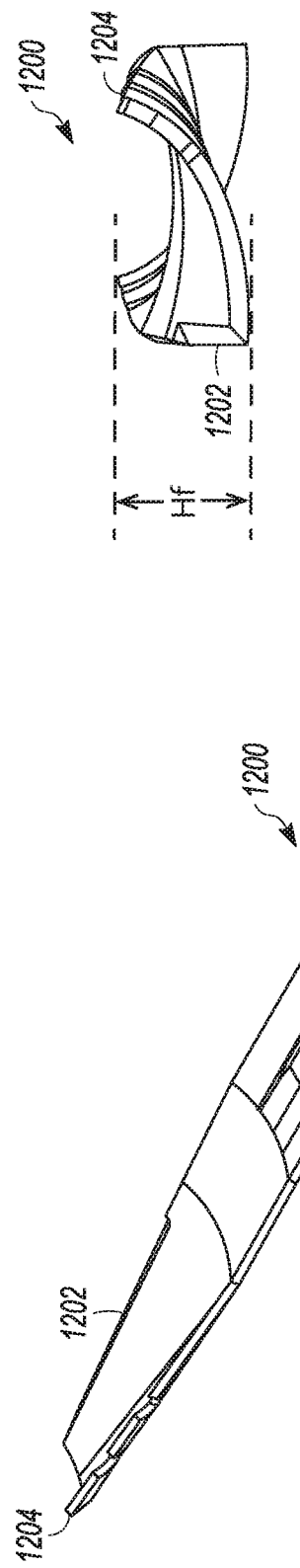
FIG. 12B is a front elevational view of the mower blade of FIG. 12A.
Figure 13A:
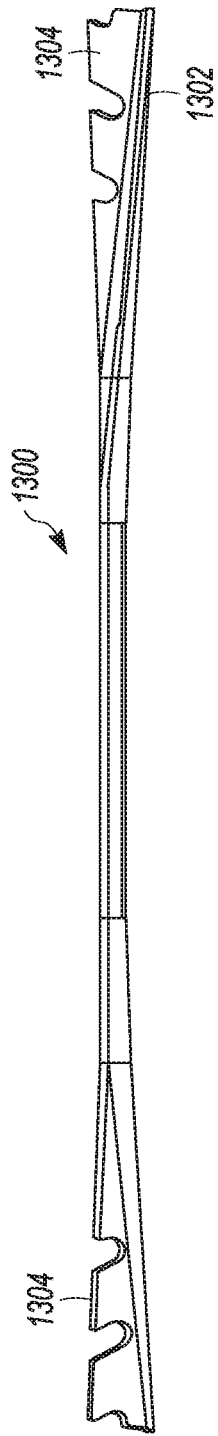
FIG. 13A is an isometric perspective view of a mower blade according to some examples.
Figure 13B:
FIG. 13B is a front elevational view of the mower blade of FIG. 13A.
Figure 13C:
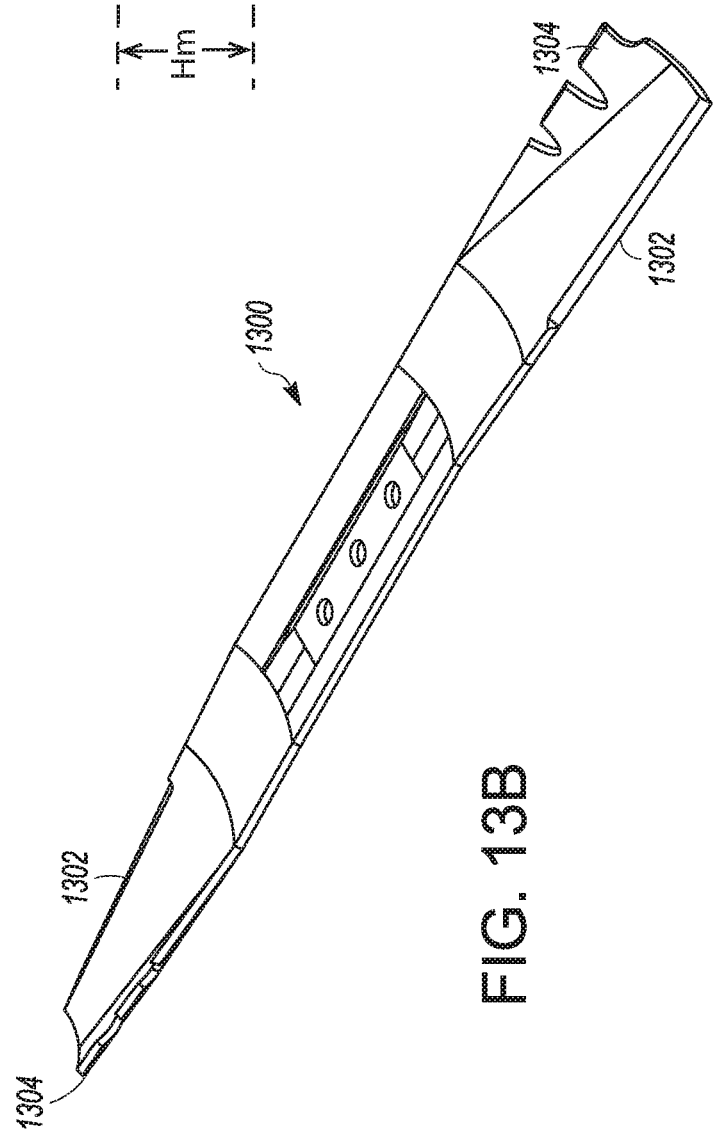
FIG. 13C is a side elevational view of the mower blade of FIG. 13A.

FIGS. 12A-C show a blade 1200 with a high sail, while FIGS. 13A-C show a blade 1300 with a medium sail. Blade 1200 includes a sharpened cutting edge 1202 and a blade sail area 1204. Blade 1300 includes a sharpened cutting edge 1302 and a blade sail area 1304. Blade 1200, blade 1300, and many different options for cutting blade configurations can be used with any of the examples described herein.

Fixed Blade Sail

Both cutting blade 1200 and cutting blade 1300 have a fixed blade sail. Mowers having cutting blades with moveable flaps in the blade sail area are known in the prior art. In contrast, a blade with a fixed blade sail does not have moveable parts in the blade sail area. In some examples, blade 1200 and blade 1300 are formed from a single piece of material, such as steel.

Medium Blade Sail

In any of the embodiments described herein, one option is to use a cutting blade having a medium blade sail. A blade with too little sail will not generate sufficient air flow to give good bagging performance. A blade with too much sail will perform well at bagging, but will draw excessive power from the limited resources of a battery powered mower.

The amount of blade sail is determined by the angle of the blade sail and the blade sail area. One aspect of the blade sail is the height as shown by Hf for a full or high blade sail in FIG. 12C and Hm for a medium blade sail in FIG. 13C. In the examples of FIGS. 12C and 13C, the width of the blade as measured from side to side in the view of FIGS. 12C and 13C is about 2.32 inches (59 millimeters (mm)). In some examples, Hm of FIG. 13C is at least about 0.5 inch (13 millimeters (mm)), at most about 1 inch (25 mm), at most about 1.5 inch (38 mm), or about 0.77 inch (20 mm). In contrast, a full blade sail of FIG. 12C is greater than 1 inch (2.5 cm), or about 1.01 inch (2.5 cm).

Discharge Mode

In some examples, the mower is capable of a discharge mode where grass is discharged from the cutting deck but is not bagged. Mower 101 shown in FIG. 1 includes a side discharge door 160. Mower 701 shown in FIG. 8 also includes a side discharge door 860. To operate in discharge mode using the side discharge opening, the mulch door will be in a closed position and the side discharge door will be open. A side discharge chute (not shown) may be attached to the side discharge door to direct the grass clippings. In one example, the default speed of the mower will be a first, lower speed when the discharge mode is used. In this example, the closed position of the mulch door indicates either a discharge mode or a mulching mode and the mower operates at a first, lower speed in both the discharge mode or in the mulching mode.

In other examples, mower 101 or mower 701 may be provided without a side discharge door. A discharge mode may still be provided by a rear-attaching discharge chute (not shown) that can attach to the rear of the mower in place of the collection bag. In some examples, the rear-attached discharge chute is shaped to direct grass clippings toward a side of the mower. In this example, the mulch door will be open in the discharge mode. As a result, the system will run at a second, higher speed in the discharge mode and in the bagging mode.

It should be noted that, as used in this specification and the appended claims, the singular forms "a," "an," and "the" include plural referents unless the content clearly dictates otherwise. It should also be noted that the term "or" is generally employed in its sense including "and/or" unless the context clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A mower comprising:
   a cutting deck supporting a cutting blade that is rotatable around a substantially vertical axis, the cutting blade having a fixed blade sail;
   an opening in the cutting deck through which grass clippings can pass;
   a collection bag configured to receive grass clippings that pass through the opening in the cutting deck;
   a door having a first position in which the door covers the opening, and a second position in which the door does not cover the opening;
   a switch configured to send a mode signal indicating that the door is in the first position or the second position;
   a trip affixed to the mower, the trip configured such that a change in door position causes the trip to be sensed by the switch;
   a controller configured to receive the mode signal and adjust the cutting blade to rotate at a first speed when the mode signal indicates that the door is in the first position, and a second speed when the mode signal indicates that the door is in the second position, wherein the first speed is different from the second speed; and
   an electric battery operable to power rotation of the cutting blade at the first speed and at the second speed.

2. The mower of claim 1, wherein the cutting blade has a medium blade sail height of 1.5 inch (38 mm) or less.

3. The mower of claim 1, wherein the first speed is lower than the second speed.

4. The mower of claim 1, wherein the first speed is between about 2200 and 2400 rotations per minute, and the second speed is between about 2600 and 2800 rotations per minute.

5. The mower of claim 1, wherein the second speed is a maximum speed of the mower.

6. The mower of claim 1, wherein the first speed is a variable speed that varies within a speed range, wherein the second speed is higher than the speed range of the first speed, and wherein the controller is further configured to step up blade speed to the second speed in response to receiving the mode signal indicating that the door is in the second position.

7. The mower of claim 1, wherein the mower is configured such that attaching the collection bag to the mower causes the trip to be sensed by the switch.

8. The mower of claim 1, wherein the collection bag is removably attachable to the mower, and wherein a position of the door is independent of whether the collection bag is attached to the mower.

9. A mower comprising:
   a cutting deck supporting a cutting blade that is rotatable around a substantially vertical axis, the cutting blade having a fixed blade sail;
   an opening in the cutting deck through which grass clippings can pass;
   a collection bag configured to receive grass clippings that pass through the opening in the cutting deck;
   a door adjacent to the opening, the door having a first position in which the door covers the opening, and a second position in which the door does not cover the opening;
   a handle configured to move the door between the first position and the second position;
   a switch configured to send a mode signal indicating that the door is in the first position or the second position;
   a controller configured to receive the mode signal and adjust the cutting blade to rotate at a first speed when the mode signal indicates that the door is in the first position, and a second speed when the mode signal indicates that the door is in the second position wherein the first speed is different from the second speed; and
   an electric battery operable to power rotation of the cutting blade at the first speed and at the second speed.

10. The mower of claim 9, wherein the handle and the door are an integrally formed unit.

11. The mower of claim 10, wherein the switch is configured to be tripped by rotation of the integrally formed unit around a substantially horizontal axis.

12. The mower of claim 9, further comprising a trip that triggers the switch to send the mode signal.

13. The mower of claim 9, wherein the switch is a Hall effect sensor.

14. A mower comprising:
a cutting deck supporting a cutting blade that is rotatable around a substantially vertical axis, the cutting blade having a fixed blade sail;
a motor controlling the cutting blade to operate at one of a first rate of speed and a second rate of speed;
an electric battery configured to power the motor;
an opening in the cutting deck through which grass clippings can pass;
a collection bag configured to receive grass clippings that pass through the opening in the cutting deck;
a door pivotably attached to the cutting deck, the door having a first configuration in which the door obstructs the opening and a second configuration in which the door does not obstruct the opening;
a sensor fixedly attached to the mower, the sensor configured to send a mode signal based on a configuration of the door; and
a controller configured to receive the mode signal and instruct the motor to operate the cutting blade at the first rate of speed or the second rate of speed based on the mode signal, wherein the first speed is different from the second speed.

15. The mower of claim 14, wherein the door rests on top of the collection bag when the collection bag is attached to the mower and when the door is in the second configuration.

16. The mower of claim 14, wherein the sensor is a Hall effect sensor.

17. The mower of claim 14, wherein the first configuration corresponds to a mulch mode and the second configuration corresponds to a bagging mode.

18. The mower of claim 14, further comprising a trip configured to trigger the sensor to send the mode signal.

19. The mower of claim 18, wherein the trip is fixedly attached to the door.

20. The mower of claim 18, wherein the sensor is a Hall effect sensor and the trip is a magnet.

* * * * *